United States Patent
Liu et al.

(10) Patent No.: US 6,760,847 B1
(45) Date of Patent: Jul. 6, 2004

(54) METHOD FOR PERFORMING SUBSCRIBER LOOP DISTURBER RECOGNITION BY COMPARING MEASURED SAMPLE POWER SPECTRAL DENSITIES WITH A SET OF KNOWN POWER SPECTRAL DENSITIES

(75) Inventors: Gin Liu, Brampton (CA); Liqian Yao, Mississauga (CA); Michael A. Campbell, Brampton (CA); Gary T. Stone, Toronto (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/548,746

(22) Filed: Apr. 13, 2000

(51) Int. Cl.[7] ............................................. H04M 1/76
(52) U.S. Cl. ................................... 713/300; 379/417
(58) Field of Search ................................ 713/300, 340; 375/222, 296; 379/417; 341/58

(56) References Cited

U.S. PATENT DOCUMENTS

| | | | | |
|---|---|---|---|---|
| 6,055,297 A | * | 4/2000 | Terry | 379/1.01 |
| 6,088,368 A | * | 7/2000 | Rubinstain et al. | 370/480 |
| 6,209,108 B1 | * | 3/2001 | Pett et al. | 714/43 |
| 6,292,539 B1 | * | 9/2001 | Eichen et al. | 379/1.04 |
| 6,339,613 B2 | * | 1/2002 | Terry | 375/227 |
| 6,456,602 B1 | * | 9/2002 | Hwang et al. | 370/307 |
| 6,456,850 B1 | * | 9/2002 | Kim et al. | 455/453 |
| 6,470,275 B1 | * | 10/2002 | Dubinsky | 702/9 |

* cited by examiner

Primary Examiner—Thomas Lee
Assistant Examiner—Paul Yanchus, III

(57) ABSTRACT

To identify interference from other data carrying subscriber loops (i.e., from loop disturbers), a power spectral density sample may be obtained from the subscriber loop under consideration based on at least one measurement while the loop is not transmitting data. The sample power spectral density may then be correlated with each one of a set of known power spectral densities. Each known power spectral density represents a power spectral density in a loop which is not transmitting data in the presence of one of (i) no subscriber loop disturbers, (ii) a particular subscriber loop disturber, and (iii) particular subscriber loop disturbers. Based on the correlations, subscriber loop disturbers may be recognized.

21 Claims, 4 Drawing Sheets

Pattern Signature

METHOD FOR PERFORMING SUBSCRIBER LOOP DISTURBER RECOGNITION BY COMPARING MEASURED SAMPLE POWER SPECTRAL DENSITIES WITH A SET OF KNOWN POWER SPECTRAL DENSITIES

BACKGROUND OF THE INVENTION

This invention relates to a method and apparatus for subscriber loop disturber recognition.

A number of standards and recommendations have been developed for carrying high speed data on the copper wire subscriber loop that typically connects customer premise equipment (CPE) to a central office (CO). These include digital subscriber loop (xDSL) approaches, such as the asynchronous DSL (ADSL) standard (ANSI T1.413 Issue 2) and the integrated DSL (IDSL) standard (ANSI T1.601-1992) and the high-bit-rate DSL (HDSL) standard (Bellcore TA-NWT-001210 Issue 1, 1991) as well as the symmetrical DSL (SDSL) approach. Other standards for carrying digital signals on copper wire include T1 and G.Lite.

A cable running from a CO typically contains 500 to 1,000 twisted pairs (subscriber loops). The pairs are typically bundled in "binder groups". Most cables were designed for voice grade services. In consequence, while the cable itself is shielded and grounded, neither the twisted pairs nor binder groups are shielded and grounded. Because of this, particularly when more than one pair in a binder group carries high speed data, interference (cross-talk) between the data carrying pairs may increase. Interference increases the error rate for data on a pair. To maintain the error rate at an acceptable level (usually $10^{-7}$ bps), the transmission rate may be reduced to a lower rate. Some data handling approaches, such as ADSL, can automatically adjust the data transmission rate. Others, such as HDSL, cannot. If the transmission rate cannot be automatically adjusted, then whenever the cross-talk noise becomes too high, the transmitter and receiver will be unable to maintain synchronisation. This will result in data disruption, which may profoundly degrade the data rate.

A degraded data rate on a pair could be due to factors other than interference from too many data carrying pairs in a binder group. Thus, when facing a degraded data rate on a given pair, a telephone company (telco) may employ resources investigating other possible sources of the problem (such as a short). Alternatively, the telco may guess from the outset that the degradation is due to too many data carrying pairs in a binder group. If the telco believes this is the problem, the telco will wish to check how many pairs in the binder group to which the given pair belongs carry data. However, with deregulation of local carriers, the telco owning a CO—the so-called incumbent local exchange carrier (ILEC)—may not be the telco operating the given pair—the so-called competitive local exchange carrier (CLEC). In such case, neither telco, by itself, is likely to know what service is carried on all pairs running from the CO. Absent full co-operation between telcos, the necessary information may not be readily available. Even without the difficulty of competing telcos, telcos do not keep records as to which pairs are in which binder groups and, further, a telco may have faulty service records for pairs which it is operating.

When a subscriber first requests data service on a subscriber loop, a telco may wish to known the level of interference on the loop from other data carrying loops (i.e., loop disturbers) before implementing the data service. Such a baseline may assist in future diagnostics.

Therefore, there is a need for an approach to determine disturber cross-talk interference in a subscriber loop.

SUMMARY OF INVENTION

To identify interference in a subscriber loop from other data carrying subscriber loops (i.e., from loop disturbers), a power spectral density sample may be obtained from the subscriber loop under consideration based on at least one measurement while the loop is not transmitting data. The sample power spectral density may then be correlated with each one of a set of one or more known power spectral densities. Each known power spectral density represents a power spectral density in a loop which is not transmitting data in the presence of one of (i) no subscriber loop disturbers, (ii) a particular subscriber loop disturber, and (iii) particular subscriber loop disturbers. Based on the correlations, subscriber loop disturbers may be recognised.

The magnitude of the power in the characteristic power spectral density of a particular type of disturber may be greatest in a frequency band different from that of other types of disturbers. This allows pre-processing of a sampled power spectral density to select likely types of present disturbers. Such pre-processing may reduce overall processing time and increase analysis accuracy. Additionally, in some instances, this pre-processing may sufficiently accurately identify loop disturbers that a correlation operation becomes unnecessary.

Accordingly, the present invention provides a method of subscriber loop disturber recognition, comprising: receiving a sample power spectral density of said subscriber loop based on at least one measurement obtained while said subscriber loop is not transmitting data; correlating said sample power spectral density with each one of a set of one or more known power spectral densities, each known power spectral density in said set being representative of a power spectral density in a loop which is not transmitting data and is in the presence of one of (i) no subscriber loop disturbers, (ii) a particular subscriber loop disturber, and (iii) particular subscriber loop disturbers; based on said correlating, determining present subscriber loop disturbers.

In according to another aspect of the present invention, there is provided a method of subscriber loop disturber recognition, comprising: receiving an identifier for a subscriber loop in a cable; based on said subscriber loop identifier, determining whether customer records for other subscriber loops in said cable are available; if said customer records are available: determining an assumed binder group which includes said subscriber loop based on sequential identifiers for subscriber loops; identifying customer records for subscriber loops of said assumed binder group; for each identified customer record, determining whether an associated service type is a data service; based on said service type determination, determining present subscriber loop disturbers.

In according to a further aspect of the invention, there is provided apparatus for subscriber loop disturber recognition, comprising: means for receiving a sample power spectral density of said subscriber loop based on at least one measurement obtained while said subscriber loop is not transmitting data; means for correlating said sample power spectral density with each one of a set of one or more known power spectral densities, each known power spectral density in said set being representative of a power spectral density in a loop which is not transmitting data and is in the presence of one of (i) no subscriber loop disturbers, (ii) a particular subscriber loop disturber, and (iii) particular subscriber loop disturbers; means for, based on said correlating, determining present subscriber loop disturbers.

In according to a yet further aspect of the invention, there is provided a computer readable medium storing computer executable instructions that when loaded by a computing device, adapt said computing device to: receive a sample power spectral density of said subscriber loop based on at least one measurement obtained while said subscriber loop is not transmitting data; correlate said sample power spectral density with each one of a set of one or more known power spectral densities, each known power spectral density in said set being representative of a power spectral density in a loop which is not transmitting data and is in the presence of one of (i) no subscriber loop disturbers, (ii) a particular subscriber loop disturber, and (iii) particular subscriber loop disturbers; based on said correlating, determine present subscriber loop disturbers.

In according to another aspect of the invention, there is provided a memory for storing information, comprising: a first data structure stored in said memory, said first data structure comprising power spectral density patterns for different loop disturber types singly and in combinations; and a second data structure stored in said memory, said second data structure comprising frequency band indications and associated threshold values for said different loop disturber types.

In according to a further aspect of the invention, there is provided a method of subscriber loop disturber recognition, comprising: receiving a sample power spectral density of said subscriber loop based on at least one measurement obtained while said subscriber loop is not transmitting data; at each of a plurality of frequency bands, comparing an amplitude of said sample power spectral density with a threshold; based on said comparing, determining present subscriber loop disturbers.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of the invention.

DETAILED DESCRIPTION OF THE PREFERRED EMBODIMENTS

Figure 1:
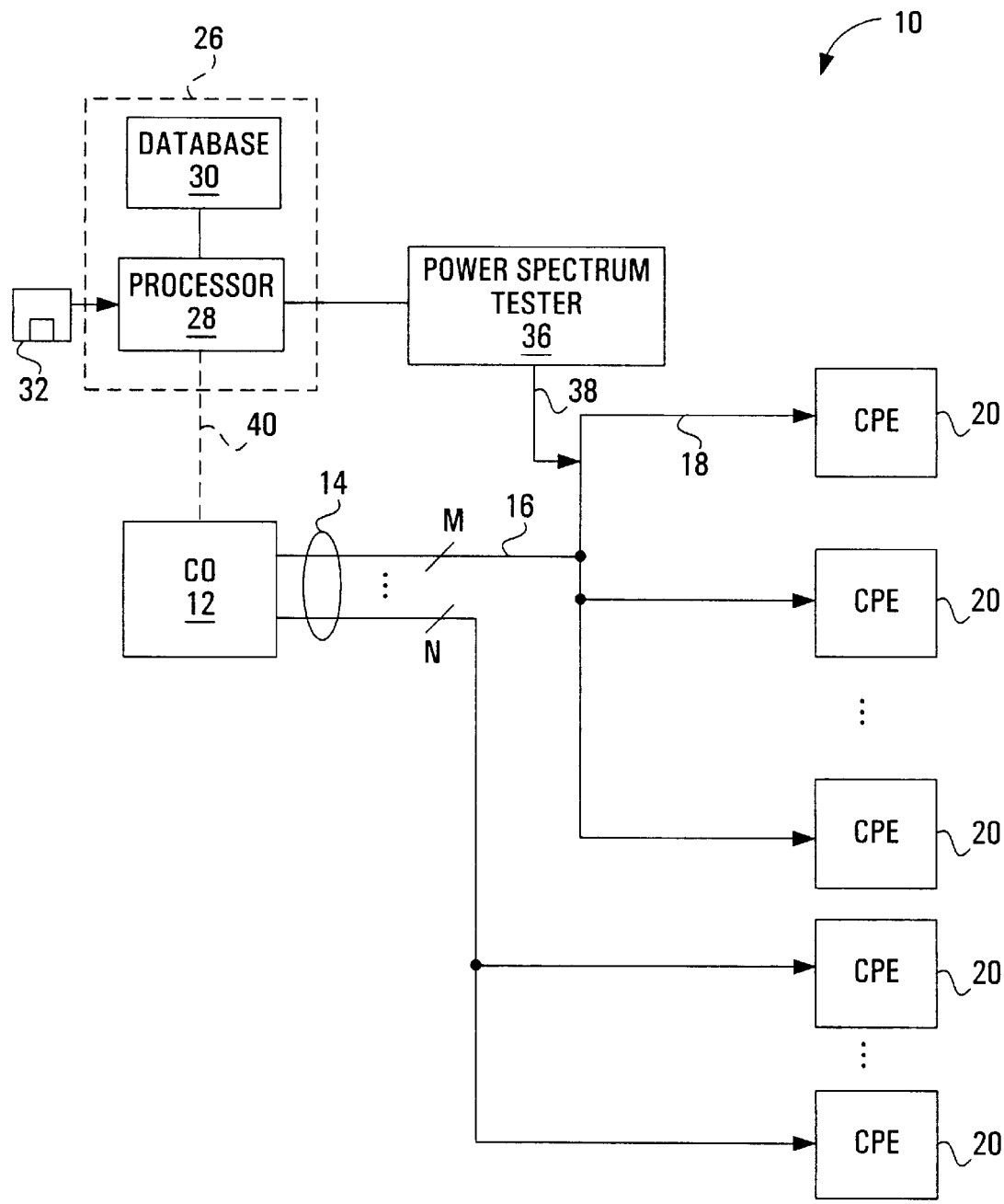
FIG. 1 is a schematic view of a system incorporating an embodiment of this invention.

Referencing FIG. 1, a system 10 incorporating an embodiment of this invention comprises a central office 12 having a cable 14, which is a bundle of binder groups 16. Each binder group is a bundle of subscriber loops (i.e., twisted pairs of wire) 18. Each subscriber loop terminates at customer premises equipment (CPE) 20.

A terminal 26, comprising a processor 28 and a database 30, is loaded with software from software medium 32. While software medium 32 is illustrated as a computer diskette, it could equally be a tape, memory chip, or other removable computer readable medium. Furthermore, the software medium may be a remote medium, such as a memory of a remote computer, and be downloaded over a suitable link such as over the Internet, an intranet, dedicated data link, or the like. The processor 28 connects to a power spectrum tester 36 (such as a Digitest Wideband Unit from Tollgrade Communications) which, in turn, may be temporarily associated with one of the subscriber loops 18 at the CO 12 via test line 38. In some instances (such as where the terminal 26 is an operations, administration, and maintenance terminal), the terminal 26 will have a data link 40 to the CO 12.

Disturbers which may be recognised are xDSL, T1 and G.Lite disturbers, as well as A.M. radio. Some xDSL disturbers have different pre-defined data rates. The particular data rate on a subscriber loop will depend upon the level of service subscribed to and may depend on the error rate (since some xDSL approaches contemplate dropping the data rate in a step-wise manner in the face of unacceptable error rates). Each pre-defined data rate for a disturber comprises one disturber type. In an exemplary embodiment, there are eleven disturber types which may be recognised, the characteristics for which are set out hereinbelow in Table I.

TABLE I

| Disturber | Disturber Types | | First Frequency Drop-off Point in PSD (kHz) | Frequency Band | |
|---|---|---|---|---|---|
| Line Coding | name | rate (kbps) | | high-pass ($f_{3db}$ kHz) | low-pass ($f_{3db}$ kHz) |
| DMT | G.Lite | 1000–4000 | — | 138 | 552 |
| | ASDL (downstream) | 1000–8000 | — | 140 | 1104 |
| 2B1Q | HDSL | 784 | 392 | n/a | 196 |
| | HDSL | 1544 | 772 | n/a | 3000 |
| | IDSL | 56 | 28 | n/a | 28 |
| | IDSL | 64 | 32 | n/a | 32 |
| | IDSL | 128 | 64 | n/a | 64 |
| | IDSL | 160 | 80 | n/a | 80 |
| | SDSL | 384 | 192 | n/a | 192 |
| AMI | T1 | 1544 | 1544 | 40 | 3000 |
| AM | Radio | n/a | n/a | 540 | 1700 |

Figure 2:
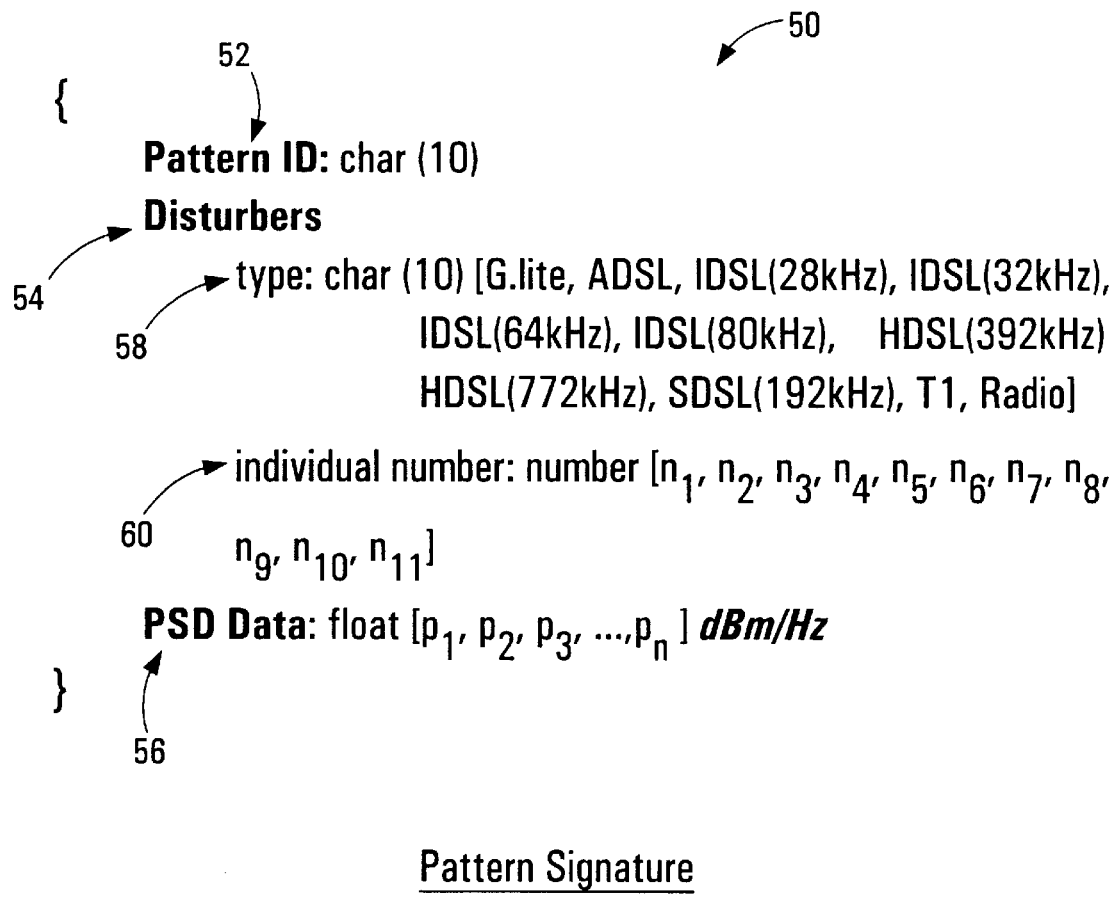
FIG. 2 illustrates an exemplary record for a power spectrum density (PSD)

Database 30 stores characteristic power spectrum densities for each of these subscriber loop disturber types as well as for combinations of these subscriber loop disturber types. As illustrated at a high level in FIG. 2, each of these disturber PSD patterns is stored as a data record 50 with a pattern identifier 52, disturber information 54 and PSD data 56. The disturber information comprises disturber types 58 contributing to the pattern and the number 60 of individual disturbers in each type. By way of example, the PSD data may span the frequency range 15 kHz to 2 MHz with a 1 kHz resolution such that there are 1986 data points in total. In this regard, because the PSD tester 36 will not be able to sense powers below a certain level, any power in the PSD having a value below that certain level is set at the minimum measurable level.

Figure 3:
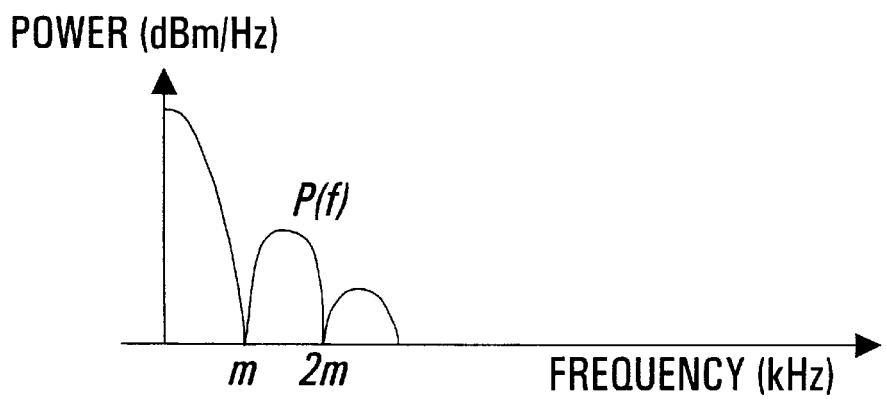
FIG. 3 is a graph of an exemplary PSD pattern.

PSD (W/Hz) patterns for a number (n) of data transmitting disturbers of any one type may be determined from known formulae. These formulae are set out in Appendix A hereto. The pattern for radio is determined from tests in the field (e.g., measurements obtained at CO 12 from a twisted pair in a binder group having no data transmission pairs). An exemplary PSD pattern for a single disturber having 2B1Q line coding is as shown in FIG. 3; this pattern applies to IDSL, HDSL, and SDSL. PSD patterns involving more than one disturber type are not presently derived from formulae as these are non-linear combinations of PSD patterns involving only one disturber type. Thus, such PSD patterns may be determined from bench tests.

Database 30 must store one PSD pattern for each disturber type and combination of disturber types which are to be recognised. The total number of patterns which must therefore be stored are as follows:

$$\text{Total} = n + n*(n-1)/2! + n*(n-1)*(n-2)/3! + n*(n-1)*(n-2)*(n-3)/4! + \ldots + n*(n-1) \ldots 2*1/n! \quad (1)$$

where n is the number of disturbers, the first term is the number of patterns each composed of only one disturber type, the second term is the number of patterns each composed of two different disturber types, and so on. In this exemplary embodiment, it is considered to store a pattern representative of one disturber of each type and all combinations of two and three different disturber types. Further, the expected pattern in the absence of disturbers (which would be a zero valued spectrum in the ideal case, but not so in the presence of the inevitable background noise sources, such as white noise) is stored. This requires storage of a total of 232 PSD patterns in database 30.

As further explained hereinafter, for use in reducing the number of candidate PSD patterns in any given situation, database 30 also stores certain characterising information for a PSD of each disturber type.

Figure 4:
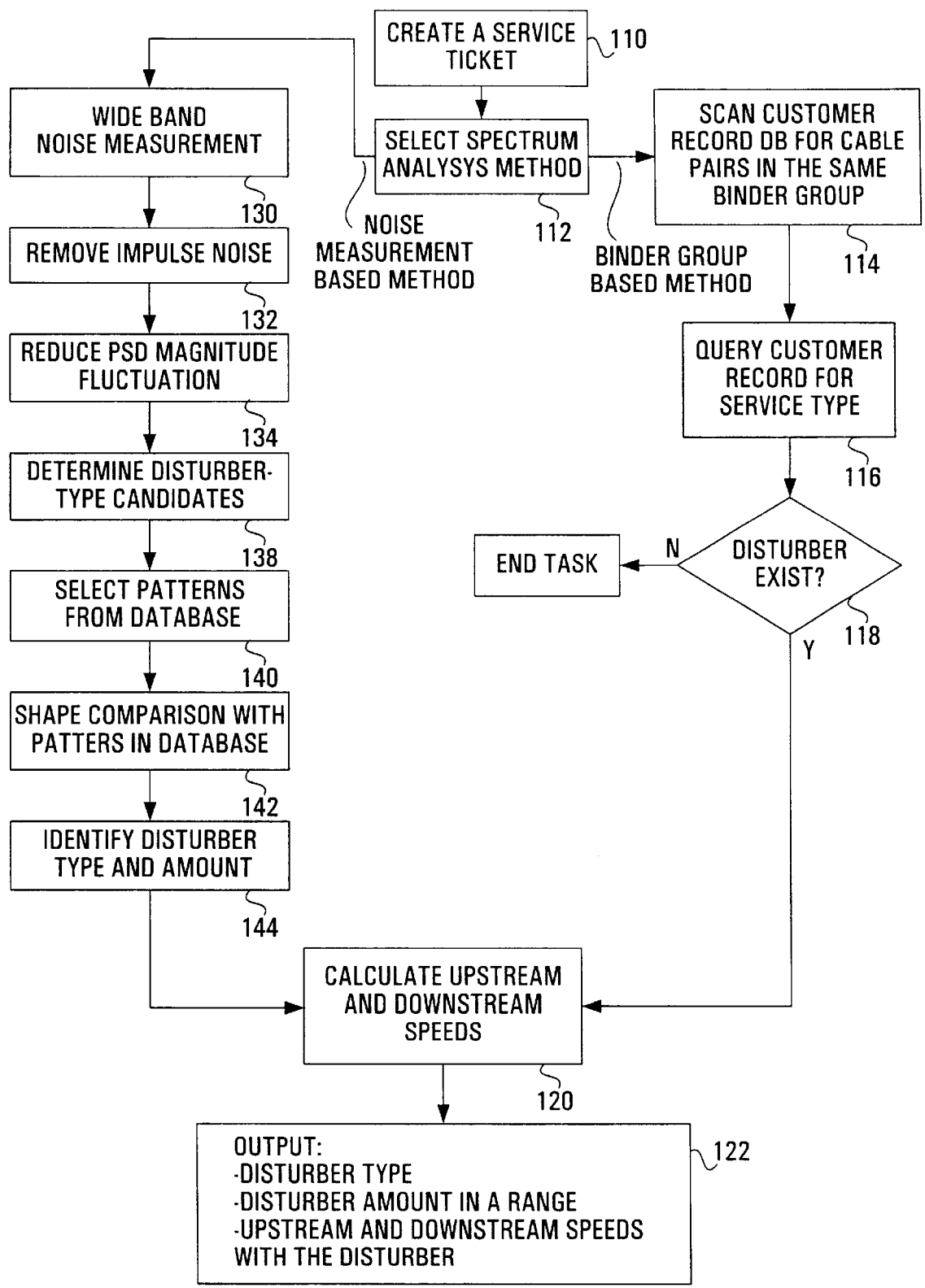
FIG. 4 is a flow chart illustrating a method in accordance with this invention.

Processor 28, operating under software control, follows the steps illustrated in FIG. 4. Turning to FIG. 4 along with FIG. 1, a user may be presented with a graphical user interface (GUI) at terminal 26. Through the GUI, the user may request a disturber analysis by first identifying a cable and a subscriber loop in the cable. The binder group for a loop is normally unknown. However, binder groups typically comprise twelve, thirteen, twenty-five, or fifty subscriber loops and the user is prompted to input the applicable value. Binder groups are formed from subscriber loops identified by consecutive identification numbers. Also, the first subscriber loop in a given cable is identified with the first loop identification number (usually, the number one). Therefore, an assumed binder group is derived based on consecutively numbered loops per binder group and the number of pairs per binder group as supplied by the user.

A service ticket is created for the request (S110). If the customer records at the CO are available to terminal 26 (via data link 40), a binder group based method may be employed (S112) and the customer records for the subscriber loop of the assumed binder group are scanned (S114). Each record is then queried for the service type (S116). The service type will indicate voice or data service and, in the case of data service, will indicate the type of data service. Where there are other subscriber loops providing data service in the binder group, each is considered a disturber of the identified loop (S118). Once the disturbers have been identified, based on the type and number of disturbers, an estimation may be made of expected upstream and downstream transmission speeds (S120). Speed estimation techniques are described in U.S. patent application Ser. No. 09/389,360, the contents of which are incorporated by reference herein. The number and type of disturbers as well as the calculated speeds are then output to the user (S122). If, prior to the service request, the actual data transmission speeds seen by the user in operation of the identified loop approximate the calculated speeds, the user may be comfortable that the cause of the observed (degraded) speed is the disturbers.

If the service records for the binder group are not available, then a noise measurement based method of disturber identification is employed. First, the user is queried as to whether the data CPE terminating the identified subscriber loop is turned off (i.e., there is no data transmission on the identified subscriber loop). If yes, one or more wide band noise measurements may be taken from the identified subscriber loop by power spectrum tester 36 (which measurements should have a resolution at least equalling that of the resolution of the PSD patterns stored in database 30) (S130). Each wide band noise measurement results in a power spectrum density (PSD) measurement for the identified subscriber loop. Multiple PSD measurements for the loop may be used to address impulse noise and reduce the effect of data fluctuation, as follows. The power in each measurement is determined for a frequency band (which, by way of example, may be for the frequency band of 15 kHz to 50 kHz). The PSD measurement which has the highest power is removed. The PSDs of the remaining measurements are then averaged (S132, S134, S136). The resulting averaged PSD is considered the PSD sample for the identified subscriber loop.

Figure 5:
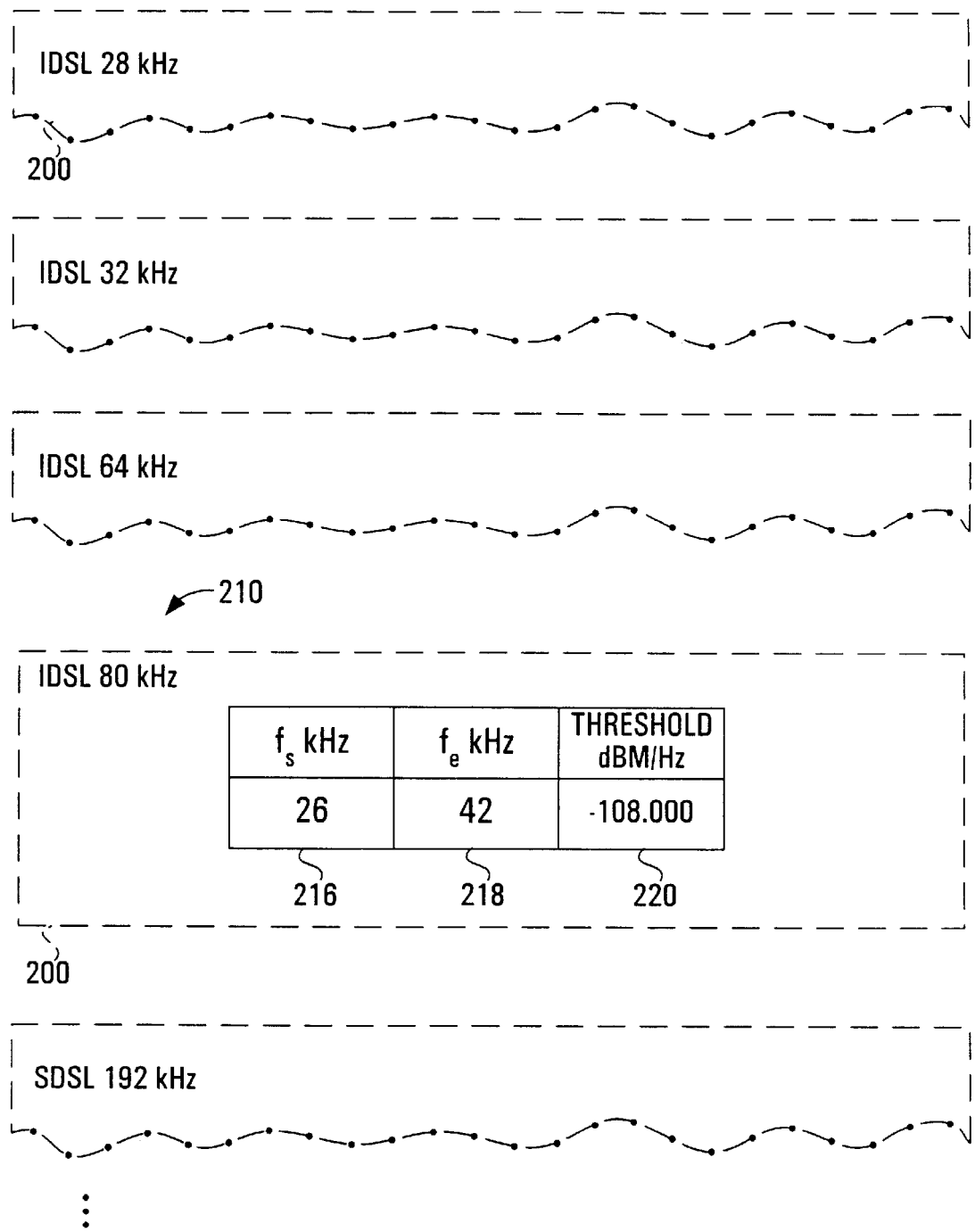
FIG. 5 illustrates exemplary data records for characteristic PSD information for disturber types.

Next candidate disturber types are identified by reference to the characteristic information on a PSD of each disturber type stored in database 30. More particularly, referencing FIG. 5, in a series of records 200, the database associates with each disturber type 210 a frequency band, between a start frequency 216 and an end frequency 218, which encompasses the peak frequency for the PSD along with a threshold 220. The threshold is selected as a value somewhat less then the average power in this frequency band.

Based on the processed sample PSD for the identified subscriber loop, the average power for the frequency bands defined by each start 216 and end 218 frequency pair is determined. For each frequency band, the determined average power in the sample PSD is compared with the threshold associated with the frequency band. Where this average power in the measured PSD in one of the frequency bands exceeds the associated threshold, the disturber type associated with the threshold is flagged as a candidate disturber type.

The average power in a frequency band of the sample PSD may be calculated using the following formula:

$$\overline{P} = \left( \sum_{m}^{n} P_X \right) / (n - m + 1)$$

where m and n are points on frequency axis, ni is the inth point possessing the $f_s$ value, while n is the nth point possessing the $f_e$ value. Px is the PSD value at each point between, and including, mn and n.

Once candidate disturber types have been settled upon, appropriate PSD patterns (FIG. 2) in the database 30 are retrieved. In this regard, formula (1) will indicate the number of PSD patterns which need to be retrieved from the database with n set at the number of disturber candidates, and the number of terms of formula (1) set at the maximum number of different disturber types stored in a PSD pattern. In the example embodiment, only up to one of each disturber type can be a candidate disturber and the maximum number of different disturber types stored in a PSD pattern is three so that the first three terms of formula (1) are employed. The retrieved PSD patterns will include patterns for each candidate disturber type singly and for all combinations of these disturber types which have been stored in database 30. All other PSD patterns in database 30 are ignored. The sample PSD is then correlated with each retrieved pattern (S142). The correlation degree, ρ, is as follows:

$$\rho = \frac{\left[\sum_{n}^{m} x_S(n) * x_P(n)\right]^2}{\sum_{n}^{m} x_S^2(n) * \sum_{n}^{m} x_P^2(n)}$$

where $x_s(n)$ is a PSD sample and $x_p(n)$ is a PSD pattern and m and n are the start and end points on the frequency axis which form a correlation calculation range. Before performing the correlation, a constant value may be added to all data points of both the sample PSD data and the pattern PSD data so that all data points are positive valued. This increases correlation sensitivity. The correlation calculation range has, as a low frequency cut off, the lowest high-pass frequency indicated in Table I for the disturber types which contributed to the given pattern. The high frequency cut off is the highest low-pass frequency indicated in Table I for the disturber types which contributed to the given pattern. This information from Table I is stored in database 30.

The larger the correlation degree, the more similar the stored pattern PSD is with the sample PSD. A correlation degree of one (i.e., ρ=1) means that the shape of the stored PSD pattern is identical to that of the sample PSD.

If the correlation of the sample PSD with a pattern PSD results in a ρ higher than a certain value, for example, ρ>=0.5 then the pattern is chosen. If no retrieved disturber pattern meets this threshold, then the "no disturber" pattern is retrieved and correlated with the measured pattern. If ρ>=0.5, then the "no disturber" pattern is chosen, otherwise, a "no match" conclusion is reached.

If no candidate disturber types are identified, then the only pattern retrieved from database 30 is the "no disturber" pattern. This pattern is correlated with the measured pattern and if ρ>=0.5, the "no disturber" pattern is chosen; otherwise a "no match" conclusion is reached.

As an alternative, rather than using a global threshold value for ρ, a different ρ value may be used in respect of each stored PSD pattern in which case the particular ρ value may be stored in association with the PSD pattern.

As will be apparent, these correlation operations assist in eliminating candidate disturbers which are not present (i.e., "false positives").

It may be that as a result of the foregoing process several patterns are chosen. If so, each chosen pattern may be displayed to a user or, alternatively, the (for example, three) patterns with the highest correlation degree may be displayed.

With the noise based method, the expected transmission speeds on the subscriber loop are based on the noise measurements on the loop.

Preferably, when a high speed data service is requested for a subscriber loop, the method of FIG. 4 is first employed to obtain a baseline estimate of the expected upstream and downstream transmission speeds for the data service. Thereafter, comparisons of actual speeds with the expected speeds will provide indications of any problems.

While the database 30 has been described as storing records 50 of PSD patterns of up to three different disturber types, obviously the database could store additional combinations. Further, while the database has been described as storing combinations contributed to by at most one instance of a given disturber type, obviously the database could store combinations contributed to by more than one instance of a given disturbers type. Further, while eleven disturber types have been described, additional disturber types are known and may be usefully included in the database to improve accuracy of disturber determinations. As further combinations are added, the number of patterns stored may balloon, thus there is a trade-off between number of possible combinations examined and processing time.

In some instances, it may be that completion of the noise based measurement method down to the end of step 140 is sufficient to adequately identify loop disturbers. In other words, the correlation operation of step 142 may be unnecessary.

Other modifications will be apparent to those skilled in the art and, therefore, the invention is defined in the claims.

APPENDIX A

PSD Calculation Formulae
The following formulae provide theoretic values for a single disturber type near end cross-talk noise PSD (watts/hz).

1. IDSL line coding method: 2B1Q
transmission voltage: V = 2.5 v
resistance: R = 135 ohm
transmission rate:

80 ksymbol/sec($f_0$ = 80 khz), 64 ksymbol/sec($f_0$ = 64 khz), 32 ksymbol/sec($f_0$ = 32 khz), 28 ksymbol/sec($f_0$ = 28 khz)
low pass filter: $f_{3db}$ = 80 khz, $f_{3db}$ = 64 khz,
$f_{3db}$ = 32 khz, $f_{3db}$ = 28 khz
high pass filter: n/a
$PSD_{IDSL} = 5/9 * V^2/R * 2/f_0 * ([\sin(\pi f/f_0)]^2 / (\pi f/f_0)^2) * (1/(1 + (f/f_{3db})^4) * (0.8536E-14 * n^{0.6} * f^{3/2})$
where n (<50) is the disturber number, e.g. 10 IDSLs etc.

2. HDSL line coding method: 2B1Q
transmission voltage: V = 2.7 v
resistance: R = 135 ohm
transmission rate: 392 ksymbol/sec($f_0$ = 392 khz),
772 ksymbol/sec($f_0$ = 772 khz),
low pass filter: $f_{3db}$ = 196 khz, $f_{3db}$ = 386 khz
high pass filter: n/a
$PSD_{HDSL} = 5/9 * V^2/R * 2/f_0 * ([\sin(\pi f/f_0)]^2 / (\pi f/f_0)^2) * (1/(1 + (f/f_{3db})^8) * (0.8536E-14 * n^{0.6} * f^{3/2})$
where n (<50) is the disturber number, e.g. 10 HDSLs etc.

3. SDSL line coding method: 2B1Q
transmission voltage: V = 2.5 v
resistance: R = 135 ohm
transmission rate: 192 ksymbol/sec($f_0$ = 192 khz)
low pass filter: $f_{3db}$ = 192 khz
high pass filter: n/a
$PSD_{SDSL} = 5/9 * V^2/R * 2/f_0 * ([\sin(\pi f/f_0)]^2 / (\pi f/f_0)^2) * (1/(1 + (f/f_{3db})^4) * (0.8536E-14 * n^{0.6} * f^{3/2})$
where n (<50) is the disturber number, e.g. 10 SDSLs etc.

4. T1 line coding method: AMI
transmission voltage: V = 3.6 v
resistance: R = 100 ohm
transmission rate: 1.544 Mbit/sec($f_0$ = 1544 khz)
low pass filter: $f_{3db}$ = 3000 khz
high pass filter: $f_{3db}$ = 40 khz
$PSD_{T1} = 1/4 * V^2/R * 2/f_0 * (\sin(\pi f/f_0) / (\pi f/f_0))^2) * \sin^2(\pi f/2f_0) * (1/(1 + (f/f_{3db})^6) * (f^2/(f^2 + f_{3db}^2)) * (0.8536E-14 * n^{0.6} * f^{3/2})$
where n (<50) is the disturber number, e.g. 10 T1s etc.

5. ADSL line coding method: DMT
transmission voltage: V = 3.7 v
resistance: R = 100 ohm
sampling frequency: $f_0$ = 2208 khz
low pass filter: $f_{3db}$ = 1.104 khz, α = 11.96

APPENDIX A-continued

PSD Calculation Formulae
The following formulae provide theoretic values for a
single disturber type near end cross-talk noise PSD (watts/hz).

high pass filter: $f_{3db\_1} = 4$ khz,
$f_{3db\_2} = 25.875$ khz, $\alpha = 7.09$
$PSD_{ADSL} = V^2/R * 2/f_0 * ([\sin(\pi f/f_0)]^2 / (\pi f/f_0)^2) *$
$(1/(1 + (f/f_{3db})^\alpha) * (1 + (f_{3db\_1}/f)^\alpha) /$
$(1 + (f_{3db\_2}/f)^\alpha)$
$\quad (0.8536E\text{-}14 * n^{0.6} * f^{3/2})$
where n (<50) is the disturber number, e.g. 10 ADSLs etc.
This formula for ADSL determines downstream signal
cross-talk in the upstream signal.
6. G.Lite The manner of determining the PSD for G.Lite is the same as
that for ADSL except that the upper cut-off frequency is
lower due to the lower data rates.

What is claimed is:

1. A method of subscriber loop disturber recognition, comprising:
   receiving a sample power spectral density of said subscriber loop based on at least one measurement obtained while said subscriber loop is not transmitting data;
   at each of a plurality of frequencies, comparing an amplitude of said sample power spectral density with a threshold;
   based on said comparing, selecting from a universe of known power spectral densities a set of one or more known power spectral densities, each known power spectral density in said set being representative of a power spectral density in a loop which is not transmitting data and is in the presence of one of (i) no subscriber loop disturbers, (ii) a particular subscriber loop disturber, and (iii) particular subscriber loop disturbers;
   correlating said sample power spectral density with each one of said set of known power spectral densities; and
   based on said correlating, determining present subscriber loop disturbers.

2. The method of claim 1 further comprising:
   prior to said receiving, obtaining at least one power spectral density measurement from said subscriber loop while said subscriber loop is not transmitting data.

3. A method of subscriber loop disturber recognition, comprising:
   receiving a sample power spectral density of said subscriber loop based on at least one measurement obtained while said subscriber loop is not transmitting data;
   at each of a plurality of frequency bands, comparing a measure of power of said measured power spectral density with a threshold;
   based on said comparing, selecting from a database of known power spectral densities a set of one or more known power spectral densities, each known power spectral density in said set being representative of a power spectral density in a loop which is not transmitting data and is in the presence of one of (i) no subscriber loop disturbers, (ii) a particular subscriber loop disturber, and (iii) particular subscriber loop disturbers;
   correlating said sample power spectral density with each one of said set of known power spectral densities; and
   based on said correlating, determining present subscriber loop disturbers.

4. The method of claim 3 wherein said measure is average power density over each of said frequency bands.

5. The method of claim 4 further comprising:
   prior to said receiving, obtaining a plurality of power spectral density measurements from said subscriber loop while said subscriber loop is not transmitting data;
   determining a measure of power in each of said power spectral density measurements,
   identifying a power spectral density measurement having a largest measure of power;
   determining, as said sample power spectral density, an average power spectral density based on each of said power spectral density measurements save said identified power spectral density measurement.

6. Apparatus for subscriber loop disturber recognition, comprising:
   means for receiving a sample power spectral density of said subscriber loop based on at least one measurement obtained while said subscriber loop is not transmitting data;
   means for comparing a measure of power of said sample power spectral density with a threshold at each of a plurality of frequency bands;
   means for selecting based on said comparing a set of one or more known power spectral densities from a database of known power spectral densities, each known power spectral density in said set being representative of a power spectral density in a loop which is not transmitting data and is in the presence of one of (i) no subscriber loop disturbers, (ii) a particular subscriber loop disturber, and (iii) particular subscriber loop disturbers;
   means for correlating said sample power spectral density with each one of said set of known power spectral densities; and
   means for, based on said correlating, determining present subscriber loop disturbers.

7. A computer readable medium storing computer executable instructions that when loaded by a computing device, adapt said computing device to:
   receive a sample power spectral density of said subscriber loop based on at least one measurement obtained while said subscriber loop is not transmitting data;
   at each of a plurality of frequency bands, compare a measure of power of said sample power spectral density with a threshold;
   based on said comparing, select from a database of known power spectral densities said a set of one or more known power spectral densities, each known power spectral density in said set being representative of a power spectral density in a loop which is not transmitting data and is in the presence of one of (i) no subscriber loop disturbers, (ii) a particular subscriber loop disturber, and (iii) particular subscriber loop disturbers from a universe of known power spectral densities;
   correlate said sample power spectral density with each one of said set of known power spectral densities; and
   based on said correlating, determine present subscriber loop disturbers.

8. A memory storing information for use by a computing device in the determination of present subscriber line disturbers, comprising:

a first data structure stored in said memory, said first data structure comprising power spectral density patters for different loop disturber types singly and in combinations; and a second data structure stored in said memory, said second data structure comprising frequency band indications and associated threshold values for said different loop disturber types.

9. The memory of claim 8 wherein said first data structure further comprises correlation threshold values associated with each of said power spectral density patterns.

10. The memory of claim 9 wherein said first data structure further comprises a power spectral density pattern for a loop in the presence of no disturbers.

11. A method of subscriber loop disturber recognition, comprising:

receiving a sample power spectral density of said subscriber loop based on at least one measurement obtained while said subscriber loop is not transmitting data;

at each of a plurality of frequency bands, comparing an amplitude of said sample power spectral density with a threshold;

based on said comparing, determining present subscriber loop disturbers.

12. The method of claim 11 wherein said comparing and said determining comprises accessing records, each associating a frequency band with a threshold and a disturber type.

13. A method of subscriber loop disturber recognition, comprising:

receiving a sample power spectral density (PSD) of said subscriber loop based on at least one measurement obtained while said subscriber loop is not transmitting data;

determining a set of candidate disturber types based on a measure of power of said sample PSD;

selecting from a universe of known PSD patterns a set of one or more known PSD patterns, each PSD pattern in said set being representative of a PSD in a loop which is not transmitting data and is in the presence of one or more disturbers of any of said candidate disturber types;

correlating said sample PSD with each of said PSD patterns in said set; and based on said correlating, determining present subscriber loop disturbers.

14. The method of claim 13, wherein said determining a set of candidate disturber types based on a measure of power of said sample PSD comprises:

for each known disturber type:

in a frequency band encompassing a peak frequency for said known disturber type, comparing said measure of power of said sample PSD with a threshold associated with said known disturber type; and based on said comparing, adding said known disturber type to said set of candidate disturber types.

15. The method of claim 14, wherein said known disturber type is added to said set of candidate disturber types when said measure of power exceeds said threshold.

16. The method of claim 14, wherein said threshold is a power value less than an average power for said known disturber type in said frequency band.

17. The method of claim 13, wherein said measure of power comprises an amplitude.

18. The method of claim 13, wherein said measure of power comprises an average power density.

19. The method of claim 18, wherein said average power density is computed from a plurality of PSD measurements obtained from said subscriber loop while said subscriber loop is not transmitting data.

20. The method of claim 19, wherein said average power density computation excludes a largest measured PSD of said plurality of PSD measurements.

21. The method of claim 13, wherein each PSD pattern in said set of known PSD patterns stores a maximum number N of different candidate disturber types, where N is an integer greater than one and less that the total number of different candidate disturber types.

* * * * *